Patented Aug. 12, 1930

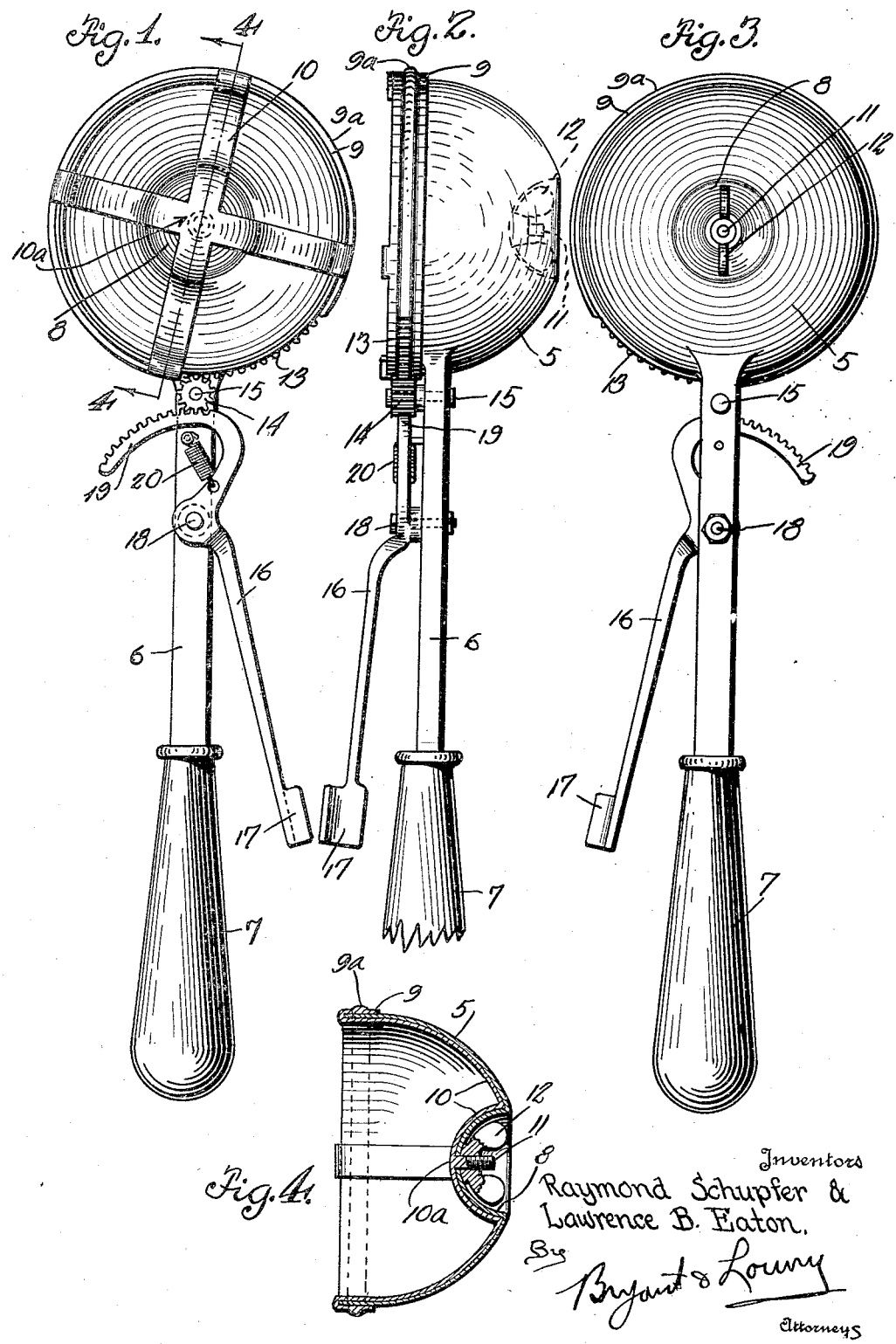

1,773,013

UNITED STATES PATENT OFFICE

RAYMOND SCHUPFER, OF PAWTUCKET, AND LAWRENCE B. EATON, OF SAYLESVILLE, RHODE ISLAND

ICE-CREAM DIPPER

Application filed April 23, 1930. Serial No. 446,670.

This invention relates to certain new and useful improvements in ice cream dippers.

The primary object of the invention is to provide an ice cream dipper or scoop embodying a hemispherical raised portion disposed centrally of the body of the dipper or scoop bowl so that an order of ice cream discharged from the dipper will have a well defined cavity centrally of the upper convex side thereof in which syrups or fruits may be placed.

A further object of the invention is to provide an ice cream scoop of the above type in which scraper blades engaged with the inner wall and centrally raised portion of the scoop body rotate in a plane parallel with the open edge of the scoop and are carried by a ring enclosing the open edge with means on the handle engageable with the ring for rotating the scraper blades.

With the above and other objects in view which will become apparent as the invention is better understood, the same consists in the novel form, combination and arrangement of parts hereinafter more fully described, shown in the accompanying drawing and claimed.

In the drawing:—

Figure 1 is a top plan view of an ice cream scoop constructed in accordance with the present invention and showing the centrally raised hemispherical portion in the body of the dipper with the scraper blades movable over the dipper body and raised portion;

Figure 2 is a side elevational view showing the ring that carries the scraper blades rotatable upon the outer edge of the dipper body and having a rack portion engaged by devices for rotating the same;

Figure 3 is a bottom plan view; and

Figure 4 is a cross-sectional view taken on line 4—4 of Figure 1 showing the manner of attaching the scraper blades to the dipper body.

Referring more in detail to the accompanying drawing, there is illustrated an ice cream dipper embodying a bowl-shaped body portion 5 to which a handle rod 6 is permanently attached with a gripping handle 7 at the outer end of the rod. The bottom of the dipper body 5 is provided with a hemispherical raised portion 8 disposed centrally thereof for the purpose of providing a cavity in the ice cream when delivered from the dipper in which syrups or fruits may be placed.

The dipper body 5 is provided with means for removing ice cream therefrom which comprises a ring 9 having an annular reinforcing bead 9ª that encloses the open side of the dipper body 5 with scraper blades 10, preferably four in number carried by the ring 9 and extending into the dipper body 5 for wiping contact with the inner face of the body and including the central raised portion 8 as clearly shown in Figures 1 and 4, the scraper blades 10 being integrally formed at their intersecting points and unitarily movable with the ring 9. The connection between the scraper blades and dipper body 5 is shown more clearly in Figure 4, a screw pin 11 carried by the central portion 10ª of the scraper blades rotatably extending through an opening in the raised portion 8 to receive a thumb nut 12 or other fastening device for retaining the same in position. The two point connection between the scraper blades and dipper body, one at the center and one at the peripheral edge results in the rotation of the scraper blades in a plane parallel with the open side of the dipper body.

The devices for effecting rotation of the scraper blades include the provision of a relatively short length of rack teeth 13 upon the bead 9ª that is engaged by a pinion 14 rotatably mounted upon the pin 15 secured to the handle rod 6. An operating lever 16 having a finger grip 17 upon one end thereof disposed adjacent the handle grip 7 is pivotally mounted as at 18 upon the handle rod 6 and includes a curved rack segment 19 that is engaged with the pinion 14, the operating lever 16 being tensioned in one direction of movement by the spring 20.

When the operating lever 16 is moved against the tension of the spring 20, the rack segment 19 rotates the pinion 14 which in turn causes rotation of the ring 9 upon the dipper body 5 and causes the scraper blades 10 to move over the entire inner face of the dipper body 5 including the hemispherical raised portion 8. As four scraper blades are provided, only relatively short movement thereof over the dipper body 5 is required for the complete removal of the body of ice cream contained in the dipper body. The ice cream discharged from the dipper body embodies a well-defined cavity in the upper convex side thereof in which syrups or fruits or other dressings may be placed.

While there is herein shown and described the preferred embodiment of the invention, it is nevertheless to be understood that minor changes may be made therein without departing from the spirit and scope of the invention as claimed.

We claim:—

1. In an ice cream dipper, a dipper body having a hemispherical raised portion centrally of the bottom, scraper blades movable over the walls of the body and raised portion, a handle carried by the body, a rack ring rotatable on the edge of the body and attached to the outer ends of the scraper blades, and manually operable means engaged with the rack ring.

2. In an ice cream dipper, a dipper body having a hemispherical raised portion centrally of the bottom, scraper blades movable over the walls of the body and raised portion, a handle carried by the body, a rack ring rotatable on the edge of the body and attached to the outer ends of the scraper blades, manually operable means engaged with the rack ring, and a rotatable connection between the inner intersecting ends of the scraper blades and raised portion in the dipper body.

3. In an ice cream dipper, a dipper body having a hemispherical raised portion centrally of the bottom, scraper blades movable over the walls of the body and raised portion, a handle carried by the body, a rack ring rotatable on the edge of the body and attached to the outer ends of the scraper blades, manually operable means engaged with the rack ring, a rotatable connection between the inner intersecting ends of the scraper blades and raised portion in the dipper body, including a pin carried by the blades extending through the dipper body, and a retainer on the projecting end of the pin.

4. In an ice cream dipper, a dipper body having a hemispherical raised portion centrally of the bottom, scraper blades movable over the walls of the body and raised portion, a handle carried by the body, a rack ring rotatable on the edge of the body and attached to the outer ends of the scraper blades, a pinion journalled on the handle in engagement with the rack ring and a lever operated rack segment on the handle engaged with the pinion.

5. In an ice cream dipper, a dipper body having a hemispherical raised portion centrally of the bottom, scraper blades movable over the walls of the body and raised portion, movable in a plane parallel with the open side of the dipper body, a handle carried by the body, a rack ring rotatable on the edge of the body and attached to the outer ends of the scraper blades, a pinion journalled on the handle in engagement with the rack ring and a lever operated rack segment on the handle engaged with the pinion.

In testimony whereof we affix our signatures.

RAYMOND SCHUPFER.
LAWRENCE B. EATON.